R. HERMAN.
AUTOMATIC SWITCH AND LOCKING DEVICE FOR LEVER CONTROL OF STEERING POSTS.
APPLICATION FILED MAR. 8, 1910.
1,093,622.
Patented Apr. 21, 1914.
2 SHEETS—SHEET 1.
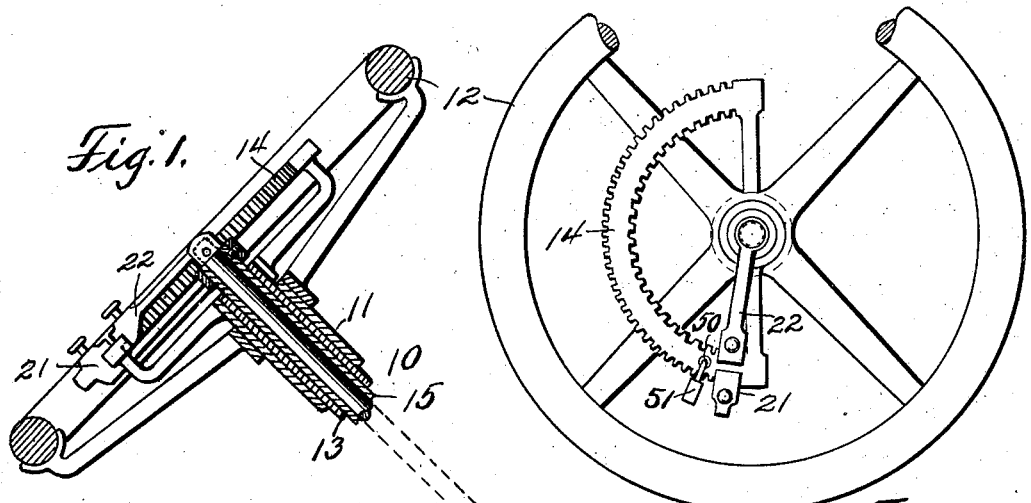

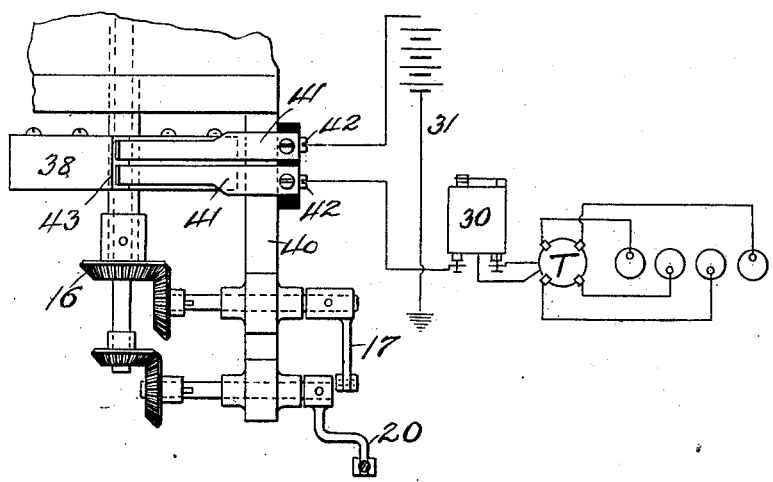

UNITED STATES PATENT OFFICE.

REINHOLD HERMAN, OF CRAFTON, PENNSYLVANIA.

AUTOMATIC SWITCH AND LOCKING DEVICE FOR LEVER CONTROL OF STEERING-POSTS.

1,093,622.  Specification of Letters Patent.  Patented Apr. 21, 1914.

Application filed March 8, 1910. Serial No. 548,079.

*To all whom it may concern:*

Be it known that I, REINHOLD HERMAN, a citizen of the United States of America, residing at Crafton, in the county of Allegheny and State of Pennsylvania, have invented certain new and useful Improvements in Automatic Switches and Locking Devices for Lever Control of Steering-Posts, of which the following is a specification, reference being had therein to the accompanying drawing.

My invention relates to devices for providing lever control of steering posts, and has particular relation to automatic switch mechanism and locking devices therefor.

The principal object of the invention is to provide means for automatically cutting out the primary circuit between the source of electricity and the vibrator of the timing mechanism, and provide for the locking up of the control levers carried by the steering post when in zero position.

A further object is to provide an automatic make and break device carried by and movable with the lever control for the timer, said make and break device being located within the primary circuit of the vibrator.

A further object is to provide a locking device operative at will for retaining the lever control of the timer in a position where the vibrator is rendered inactive through the make and break device.

Other and further objects of the invention are to provide a device of this type which is simple and efficient in operation, durable in construction and which can be manufactured and applied at a relatively low cost.

To these and other ends the nature of which will be readily understood as my invention is hereinafter disclosed, said invention consists in the improved construction and combination of parts hereinafter fully described, illustrated in the accompanying drawings, and particularly pointed out in the appended claims.

In the accompanying drawings in which similar reference characters indicate similar parts in each of the views,—Figure 1 is a longitudinal sectional view of a steering post, parts being broken away, to which my invention has been applied, said view also showing, in somewhat diagrammatic form, mechanism operated by the lever control of the steering post. Fig. 2 is a top plan view of the steering wheel. Figs. 3 and 4 are top plan views showing a preferred form of automatic switch mechanism, Fig. 3 indicating the form used in connection with a circuit adapted to be broken when the vibrator is rendered inactive, while Fig. 4 illustrates the form preferred when the circuit is closed to render the sparking mechanism inactive. Fig. 5 is a diagrammatic view showing the circuits including the make and break device shown in Fig. 3.

In the drawings 10 designates the steering post having the steering column 11 and wheel 12.

13 designates the tubular support for the lever controls and the quadrant, the latter being designated as 14.

15 designates the sleeve or tubular column which carries pinion 16 adapted to control the adjustment of the timer T, through suitable connections indicated diagrammatically at 17.

18 designates the shaft which controls the carbureter valve mechanism indicated at C, this control being provided by the pinion 19 and connections shown diagrammatically at 20.

21 designates the lever which is adapted to operate the sleeve 15, and 22 designates the lever adapted to operate the shaft 18, said levers being provided with means coöperating with the quadrant 14 for controlling their positions in operation.

The timing mechanism is of any preferred type; one type, indicated conventionally in Fig. 5, includes the vibrator 30 connected up in a primary circuit 31, the vibrator operating in the usual manner; the particular type of mechanism is immaterial.

The parts above referred to are those provided in one type of steering post mechanism for automobiles, and are illustrated simply for the purpose of indicating one way in which my present invention may be applied, it being readily understood that the same may be employed in connection with other types of control mechanism for motors having the element of timing as a factor.

The present invention pertains more particularly to the provision of a make and break device within the primary circuit of the vibrator or within a magneto circuit, depending upon which form of sparking mechanism is being employed. This make and break device is in the form of a circular member 35 composed of a metallic bushing 36 adapted to be secured on a support, such as sleeve 15, an annular ring 37 of insulation of any desired type, and a peripheral metallic ring 38 surrounding the ring 37, the bushing 36 and ring 38 being provided with flanges by means of which the parts are secured together. Secured to a suitable support 40 are a pair of spaced-apart insulated fingers 41, connected through binding posts 42 within the primary circuit, the free ends of said fingers being adapted to contact with the peripheral face of the ring 38 with sufficient pressure to provide an efficient contact therewith, the ring completing the circuit between the two fingers, the latter acting as terminals. For the purpose of providing the make and break in the circuit, where the latter is of the type indicated in Fig. 5, I provide a break in the continuity of the periphery of the ring 38, as, for instance, as illustrated in Fig. 3, where a recess 43 is provided, which recess is of a size and depth sufficient to permit the fingers 41 to be freed from contact with the ring 38 each finger having its free end provided with a curved portion 39 to provide a more efficient contact and prevent liability of a catching of parts during movements of the device 35. This freedom from contact breaks the circuit and the latter remains broken until the device 35 is rotated to again bring the ring 38 into contact with the fingers 41. Obviously, an alternative construction would be to dispense with the recess 43 and provide a suitable insulation on the peripheral plane at the point where the recess is located, this latter construction providing for a break in the circuit.

Where the sparking is provided by a magneto system of the usual type, in which case the circuit is closed to render the device inactive, the fingers 41 are positioned so as to normally remain out of contact with the periphery of the ring 38, thus permitting the magneto operation to take place at the proper time, the ring is provided with a lug or projection 45 which, during the rotative movement of the device 35, will be brought into contact with the fingers 41 and short circuit the magneto and thus render the system inactive.

In each of the forms of device 35 presented, said device is secured in position on the sleeve 15 in such manner that when the control lever 21 is at zero or at one end of the quadrant 14, the device 35 will be in the position shown in Fig. 3, or if the structure shown in Fig. 4 is used, the lug 45 will then be in contact with the fingers 41, the parts in this position completely cutting out the sparking circuit and rendering impossible the forming of a spark in the motor. When the control lever 21 is moved around the quadrant to advance the timing mechanism, the device 35 is moved pivotally to again render the sparking mechanism active either by completing the primary circuit 31 or opening the short circuit, the limit of rotative movement of the arm being immaterial, the device being so arranged as to cause the change at only one point in the rotative movement. In order that the timing mechanism may remain inactive and be held against accidental or mischievous actuation during the absence of the operator, I provide the quadrant with an opening 50 positioned in such manner as to cause any object, such as a pin, padlock 51 or other suitable device, to act as an absolute barrier against a movement of the control lever 21. And inasmuch as the control lever 22 for the carbureting device has its position in approximate alinement with the lever 21 when the carbureter valve is closed, I prefer to place the opening 50 at a point where such stop will operate equally with both levers, thereby locking them in their inactive positions and absolutely preventing operation of the motor. As will be readily understood this particular construction, operation and location of the device 35 provides especial advantages with respect to safety in operation of the motor vehicle, since there is provided an absolute make and break device operative to render the sparking inactive by a blow which will carry the control lever 21 to its inactive position and thereby requiring no time-losing adjustment. And the feature which enables the parts to be locked in their inactive positions makes the device especially advantageous as a means for preventing surreptitious using of the vehicle.

Having thus described my invention, what I claim as new is:—

1. In combination, a timing mechanism for controlling the movements of a motor, a circuit for said mechanism, a lever control for said mechanism, and means independent of the timing mechanism and permanently movable with and controlled by movements of the lever control for rendering said circuit inoperative when the lever control is shifted to a pre-determined inactive position.

2. In combination, a timing mechanism for controlling the movements of an explosive motor, a steering post, a control circuit for effecting motor explosions, a lever control carried by said post for controlling the rapidity of motor explosions, and a make and break device located within said circuit and permanently movable with said lever control for rendering the circuit inoperative when the lever control is shifted to a predetermined inactive position.

3. In combination, a timing mechanism, a steering post, a control circuit, a lever carried by the post, and a make and break device in said circuit and operated by said control, said device comprising a pair of spaced-apart terminals within the circuit and a terminal-connecting member permanently carried by and movable with the control, said member rendering the circuit inoperative only when the lever control is shifted to zero position.

4. In combination, a timing mechanism, a steering post, a quadrant carried by the post, a control circuit, a lever control for the timing mechanism also carried by said post, a make and break device including an element permanently movable with and controlled by movements of the lever control for rendering the circuit inoperative when the lever control is shifted to zero position, and means carried by the quadrant for securing the lever control in such zero position to prevent surreptitious operation of the motor.

5. In combination, a timing mechanism, a steering post, a quadrant carried by the post, a control circuit, a lever control for the timing mechanism also carried by said post, carbureter control mechanism also carried by the post and including a lever control, said lever controls being movable in the same direction to place them in substantial alinement in zero position, a make and break device for rendering the circuit inoperative when the timing lever control is shifted to zero position, and means carried by the quadrant and located at a single point for securing both controls in such zero position to prevent surreptitious operation of the motor.

6. In combination, a timing mechanism, a steering post, a control circuit, a lever control carried by the post, and a make and break device in said circuit and operated by said control, said device comprising a pair of spaced-apart terminals within the circuit and a terminal connecting member permanently carried by said control and axially alined with said post, said member being movable with the control and adapted to render the circuit inoperative only when the lever control is shifted to zero position.

7. In combination, an explosive motor for motor vehicles having a steering post, a control circuit for rendering the motor active, a lever control pivotally mounted on said post, and having a portion extending below the foot board of the vehicle, and means located within said circuit including an element mounted on said lever control portion below the foot board and movable with said lever control for rendering the circuit inoperative when the lever control is shifted to a predetermined inactive position.

In testimony whereof I affix my signature in the presence of two witnesses.

REINHOLD HERMAN.

Witnesses:
A. M. WILSON,
CHAS. P. SEEBOLD.

---

Copies of this patent may be obtained for five cents each, by addressing the "Commissioner of Patents, Washington, D. C."